(12) United States Patent
Endo et al.

(10) Patent No.: US 10,122,546 B2
(45) Date of Patent: Nov. 6, 2018

(54) WIRED-WIRELESS HYBRID COMMUNICATION SYSTEM AND WIRED-WIRELESS HYBRID COMMUNICATION METHOD

(71) Applicant: Yazaki Corporation, Tokyo (JP)

(72) Inventors: Takashi Endo, Shizuoka (JP);
Kunihiko Yamada, Shizuoka (JP); You Yanagida, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 17 days.

(21) Appl. No.: 15/442,321

(22) Filed: Feb. 24, 2017

(65) Prior Publication Data
US 2017/0257227 A1    Sep. 7, 2017

(30) Foreign Application Priority Data
Mar. 2, 2016 (JP) ................ 2016-040285

(51) Int. Cl.
| H04W 76/10 | (2018.01) |
| H04L 12/40 | (2006.01) |
| H04L 29/08 | (2006.01) |
| H04L 12/851 | (2013.01) |
| H04L 29/06 | (2006.01) |

(52) U.S. Cl.
CPC .......... *H04L 12/4015* (2013.01); *H04L 47/24* (2013.01); *H04L 67/12* (2013.01); *H04L 69/14* (2013.01); *H04W 76/10* (2018.02); *Y02D 50/30* (2018.01)

(58) Field of Classification Search
CPC ..... H04L 12/4015; H04L 67/12; H04L 47/24; H04L 69/14; H04W 76/02; H04W 76/10
See application file for complete search history.

(56) References Cited

U.S. PATENT DOCUMENTS

| 7,068,675 B1 | 6/2006 | Shitaya |
| 2015/0215899 A1 | 7/2015 | Kumar et al. |

FOREIGN PATENT DOCUMENTS

| EP | 2 899 943 A1 | 7/2015 |
| JP | 2005-151359 A | 6/2005 |
| JP | 2006-109022 A | 4/2006 |
| JP | 2007-53671 A | 3/2007 |
| JP | 2015-162795 A | 9/2015 |

OTHER PUBLICATIONS

Japanese Office Action for the related Japanese Patent Application No. 2016-040285 dated Mar. 20, 2018.
The extended European search report for the related European Patent Application No. 17157718.2 dated Jun. 26, 2017.

*Primary Examiner* — Phong La
(74) *Attorney, Agent, or Firm* — Kenealy Vaidya LLP

(57) ABSTRACT

A wired-wireless hybrid communication system and a wired-wireless hybrid communication method perform control such that, of the types of communication data transmitted and received between communication devices provided in a vehicle, wired communication is used for high-priority communication data and wireless communication is used for low-priority communication data. Specifically, wired communication data and wireless communication data divided based on the priority defined for each type of the communication data are separately transmitted via wired communication and wireless communication, and the wired communication data and the wireless communication data separately received at the received side are combined to reconstruct the communication data.

4 Claims, 7 Drawing Sheets

FIG.5

| ID | COMMUNICATION DATA TYPE |
|---|---|
| 0 | AIR BAG |
| 1 | BRAKE |
| 2 | . |
| 3 | . |
| 4 | . |
| 5 | . |
| 6 | . |

WIRED (IDs 0–3)
WIRELESS (IDs 4–6)
PRIORITY 108a, 208a

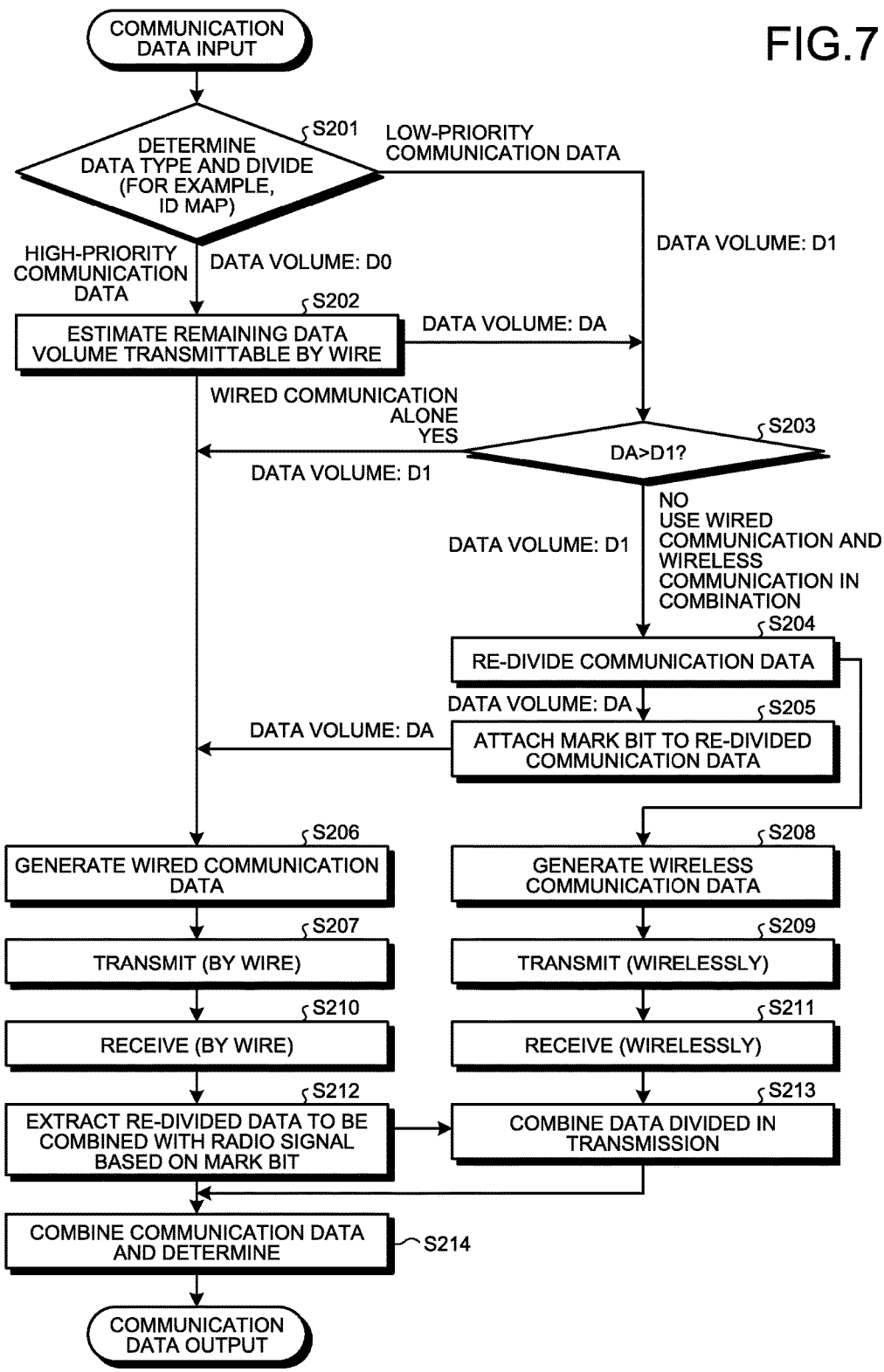

WIRED-WIRELESS HYBRID COMMUNICATION SYSTEM AND WIRED-WIRELESS HYBRID COMMUNICATION METHOD

CROSS-REFERENCE TO RELATED APPLICATION(S)

The present application claims priority to and incorporates by reference the entire contents of Japanese Patent Application No. 2016-040285 filed in Japan on Mar. 2, 2016.

BACKGROUND OF THE INVENTION

1. Field of the Invention

The present invention relates to a wired-wireless hybrid communication system and a wired-wireless hybrid communication method.

2. Description of the Related Art

In in-vehicle systems, a variety of communication data is transmitted-received between communication devices. Conventionally, such communication data has been transmitted-received via wired communication through a communication line connecting the communication devices or has been transmitted-received via wireless communication through no communication line (for example, Japanese Patent Application Laid-open No. 2015-162795).

When communication data is transmitted-received between communication devices provided in a vehicle, using wired communication improves the reliability of data communication compared with using wireless communication, but connecting all the communication devices in the vehicle through an expensive communication line capable of large-volume data communication cause the problem of increased cost. On the other hand, heavily using wireless communication in favor of costs leaves the problem of reliability of data communication. Thus, conventional techniques have room for further improvement in these problems.

SUMMARY OF THE INVENTION

The present invention is then made in view of the foregoing and aims to provide a wired-wireless hybrid communication system and a wired-wireless hybrid communication method to enable a variety of communication data to be appropriately transmitted-received via wired and wireless hybrid communication between communication devices provided in a vehicle.

In order to solve the above mentioned problem and achieve the object, a wired-wireless hybrid communication system according to one aspect of the present invention includes: a first communication device including at least a controller, a storage unit, a first wired communication interface, and a first wireless communication interface; and a second communication device connected to be able to communicate with the first communication device by wire and wirelessly, the second communication device including at least a controller, a storage unit, a second wired communication interface, and a second wireless communication interface, wherein the storage unit of the first communication device and the storage unit of the second communication device each includes a data priority information storage unit configured to store therein data priority information defining priority for each type of communication data transmitted and received between the first communication device and the second communication device provided in a vehicle, the controller of the first communication device includes a data type determining unit configured to determine a type of the communication data to be transmitted from the first communication device to the second communication device, a transmission data priority identifying unit configured to refer to the data priority information stored in the data priority information storage unit of the first communication device to identify the priority associated with the type of the communication data determined by the data type determining unit, a data dividing unit configured to make a division into communication data having high priority and communication data having low priority, based on the priority identified by the transmission data priority identifying unit, a wired communication data generating unit configured to generate the communication data having high priority divided by the data dividing unit, as wired communication data transmittable by wire, a wired transmission controller configured to transmit the wired communication data generated by the wired communication data generating unit to the second communication device through the first wired communication interface, a wireless communication data generating unit configured to generate the communication data having low priority divided by the data dividing unit, as wireless communication data transmittable wirelessly, and a wireless transmission controller configured to transmit the wireless communication data generated by the wireless communication data generating unit to the second communication device through the first wireless communication interface, the controller of the second communication device includes a wired reception controller configured to receive the wired communication data transmitted by the wired transmission controller from the first communication device, through the second wired communication interface, a wireless reception controller configured to receive the wireless communication data transmitted by the wireless transmission controller from the first communication device, through the second wireless communication interface, a received data priority identifying unit configured to refer to the data priority information stored in the data priority information storage unit of the second communication device to identify the priority associated with each of the wired communication data received by the wired reception controller and the wireless communication data received by the wireless reception controller, and a data combining unit configured to reconstruct the communication data by combining the wired communication data and the wireless communication data together, based on the priority of the wired communication data and the priority of the wireless communication data identified by the received data priority identifying unit.

According to another aspect of the present invention, in the wired-wireless hybrid communication system, it is preferable that the controller of the first communication device further includes a remaining data volume estimating unit configured to estimate a remaining data volume transmittable to the second communication device through the first wired communication interface, based on a data volume of the communication data having high priority divided by the data dividing unit and a data volume determining unit configured to determine whether a data volume of the communication data having low priority divided by the data dividing unit is smaller than the remaining data volume estimated by the remaining data volume estimating unit, and when the data volume determining unit determines that the data volume of the communication data having low priority is smaller than the remaining data volume estimated by the remaining data volume estimating unit, the wired communication data generating unit generates both of the communication data having high priority and the communication data having low priority divided by the data dividing unit as the wired communication data.

According to still another aspect of the present invention, in the wired-wireless hybrid communication system, it is preferable that when the data volume determining unit determines that the data volume of the communication data having low priority is equal to or larger than the remaining data volume estimated by the remaining data volume estimating unit, the data dividing unit re-divides the communication data having low priority so as to include part of the communication data having low priority in addition to the communication data having high priority until a data volume corresponding to the remaining data volume is reached, the wired communication data generating unit generates part of the communication data having low priority re-divided by the data dividing unit in addition to the communication data having high priority, as the wired communication data, and the wireless communication data generating unit generates remainder of the communication data having low priority not added to the communication data having high priority when re-divided by the data dividing unit, as the wireless communication data.

In order to solve the above mentioned problem and achieve the object, a wired-wireless hybrid communication method according to still another aspect of the present invention performed in a wired-wireless hybrid communication system including a first communication device and a second communication device, the first communication device at least including a controller, a storage unit, a first wired communication interface, and a first wireless communication interface, the second communication device being connected to be able to communicate with the first communication device by wire and wirelessly, the second communication device at least including a controller, a storage unit, a second wired communication interface, and a second wireless communication interface, the storage unit of the first communication device and the storage unit of the second communication device each including a data priority information storage unit configured to store therein data priority information defining priority for each type of communication data transmitted and received between the first communication device and the second communication device provided in a vehicle, the method includes: a data type determining step performed by the controller of the first communication device configured to determine a type of the communication data to be transmitted from the first communication device to the second communication device; a transmission data priority identifying step performed by the controller of the first communication device configured to refer to the data priority information stored in the data priority information storage unit of the first communication device and to identify the priority associated with the type of the communication data determined at the data type determining step; a data dividing step performed by the controller of the first communication device configured to make a division into communication data having high priority and communication data having low priority, based on the priority identified at the transmission data priority identifying step; a wired communication data generating step performed by the controller of the first communication device configured to generate the communication data having high priority divided at the data dividing step, as wired communication data transmittable by wire; a wireless communication data generating step performed by the controller of the first communication device configured to generate the communication data having low priority divided at the data dividing step, as wireless communication data transmittable wirelessly; a wired transmission controlling step performed by the controller of the first communication device configured to transmit the wired communication data generated at the wired communication data generating step to the second communication device through the first wired communication interface; a wired reception controlling step performed by the controller of the second communication device configured to receive the wired communication data transmitted from the first communication device at the wired transmission controlling step, through the second wired communication interface; a wireless transmission controlling step performed by the controller of the first communication device configured to transmit the wireless communication data generated at the wireless communication data generating step to the second communication device through the first wireless communication interface; a wireless reception controlling step performed by the controller of the second communication device configured to receive the wireless communication data transmitted from the first communication device at wireless transmission controlling step, through the second wireless communication interface; a received data priority identifying step performed by the controller of the second communication device configured to refer to the data priority information stored in the data priority information storage unit of the second communication device and to identify the priority associated with each of the wired communication data received at the wired reception controlling step and the wireless communication data received at the wireless reception controlling step; and a data combining step configured to reconstruct the communication data by combining the wired communication data and the wireless communication data together, based on the priority of the wired communication data and the priority of the wireless communication data identified at the received data priority identifying step.

According to still another aspect of the present invention, in the wired-wireless hybrid communication method, it is preferable to further include a remaining data volume estimating step performed by the controller of the first communication device configured to estimate a remaining data volume transmittable to the second communication device through the first wired communication interface, based on a data volume of the communication data having high priority divided at the data dividing step; and a data volume determining step performed by the controller of the first communication device configured to determine whether a data volume of the communication data having low priority divided at the data dividing step is smaller than the remaining data volume estimated at the remaining data volume estimating step, wherein at the wired communication data generating step, when it is determined at the data volume determining step that the data volume of the communication data having low priority is smaller than the remaining data volume estimated at the remaining data volume estimating step, both of the communication data having high priority and the communication data having low priority divided at the data dividing step are generated as the wired communication data.

According to still another aspect of the present invention, in the wired-wireless hybrid communication method, it is preferable that at the data dividing step, when it is determined at the data volume determining step that the data volume of the communication data having low priority is equal to or larger than the remaining data volume estimated at the remaining data volume estimating step, the communication data having low priority is re-divided such that part of the communication data having low priority is included in addition to the communication data having high priority until a data volume corresponding to the remaining data volume is reached, at the wired communication data generating step, part of the communication data having low priority re-divided at the data dividing step is added to the communication data having high priority and generated as the wired communication data, and at the wireless communication data generating step, remainder of the communication data having low priority not added to the communication data having high priority when re-divided at the data dividing step is generated as the wireless communication data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an exemplary data priority information storage unit according to the present embodiment;

FIG. 7 is a flowchart illustrating another example of the processing by the wired-wireless hybrid communication system according to the present embodiment.

DETAILED DESCRIPTION OF THE PREFERRED EMBODIMENTS

Embodiments for carrying out the present invention will be described in details with reference to the drawings. The description of embodiments below is not intended to limit the present invention. The components described below include those easily conceived by those skilled in the art and those substantially identical. The configurations described below can be combined as appropriate. The configurations are susceptible to elimination, substitution, and modification without departing from the scope of the present invention.

EMBODIMENTS

Figure 1:
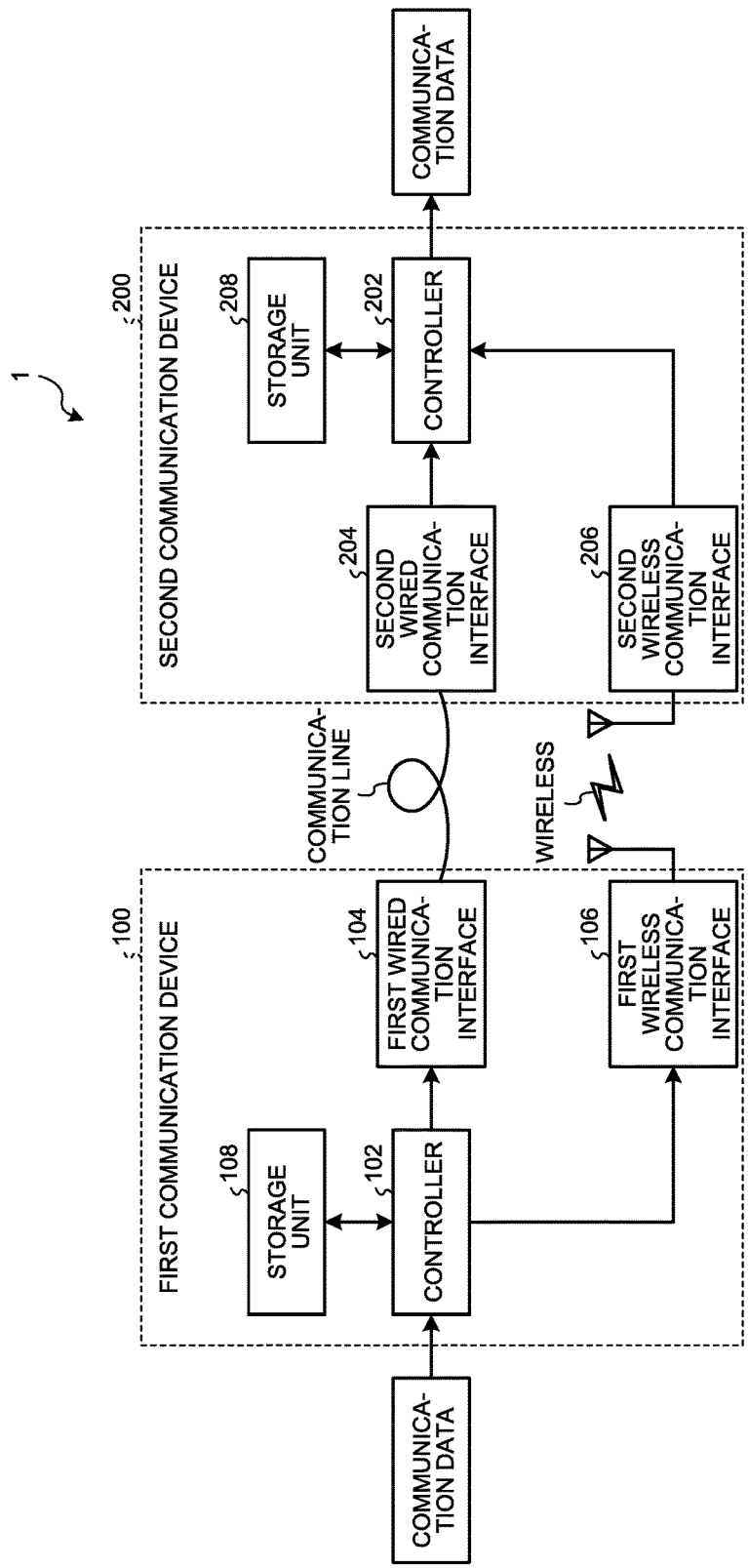
FIG. 1 is a schematic diagram of a wired-wireless hybrid communication system according to the present embodiment.
Figure 2:
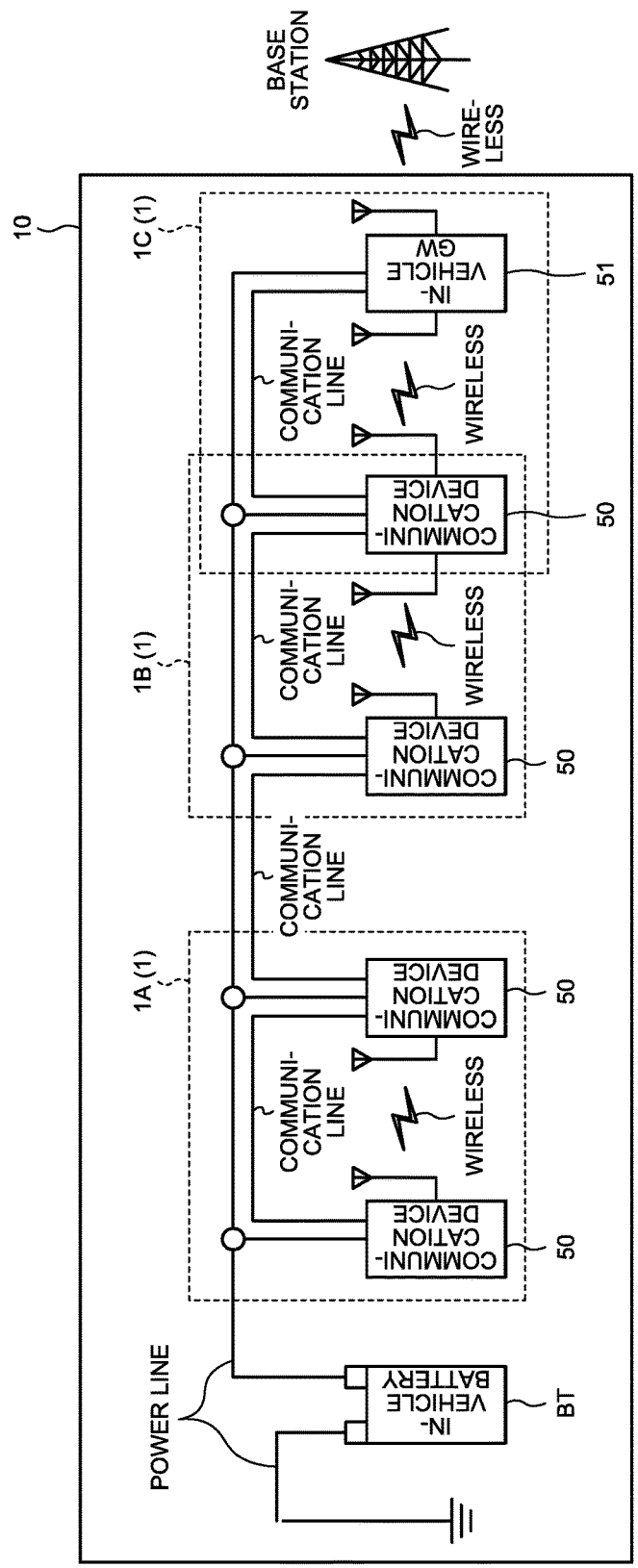
FIG. 2 is an illustration depicting an example of the wired-wireless hybrid communication system according to the present embodiment in a vehicle.
Figure 3:
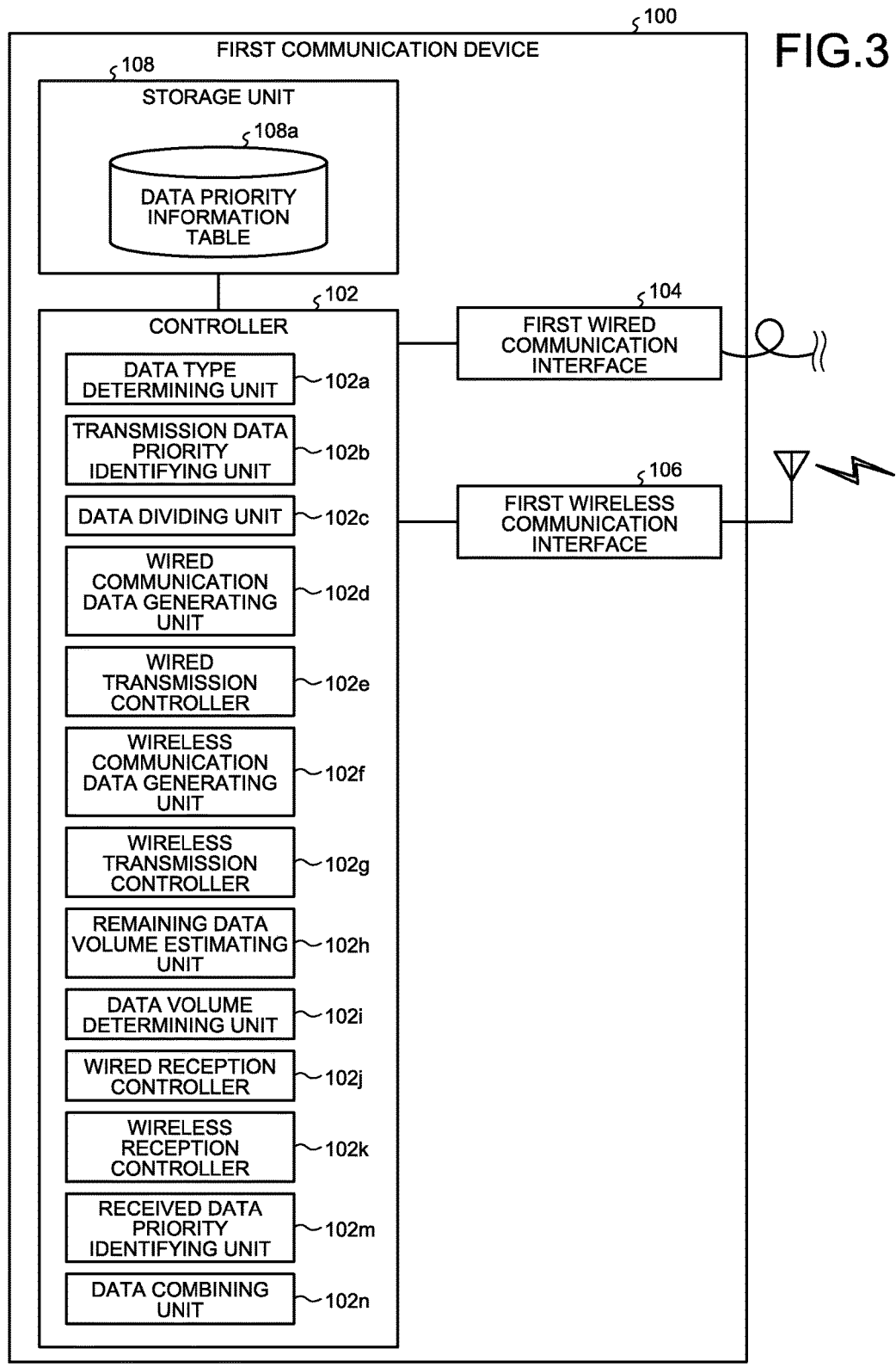
FIG. 3 is a functional configuration diagram illustrating the details of a first communication device according to the present embodiment.
Figure 4:
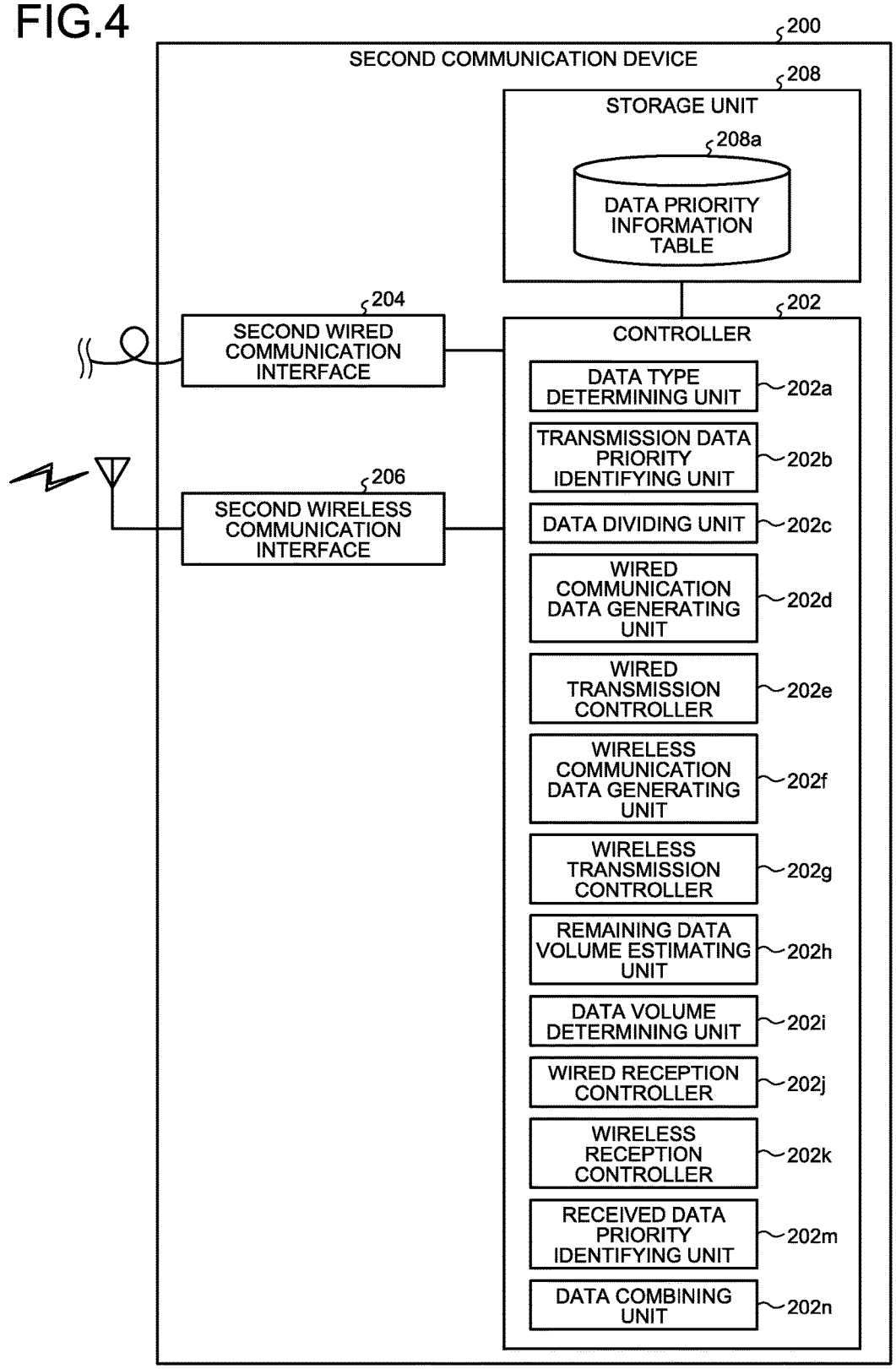
FIG. 4 is a functional configuration diagram illustrating the details of a second communication device according to the present embodiment.
Figure 5:
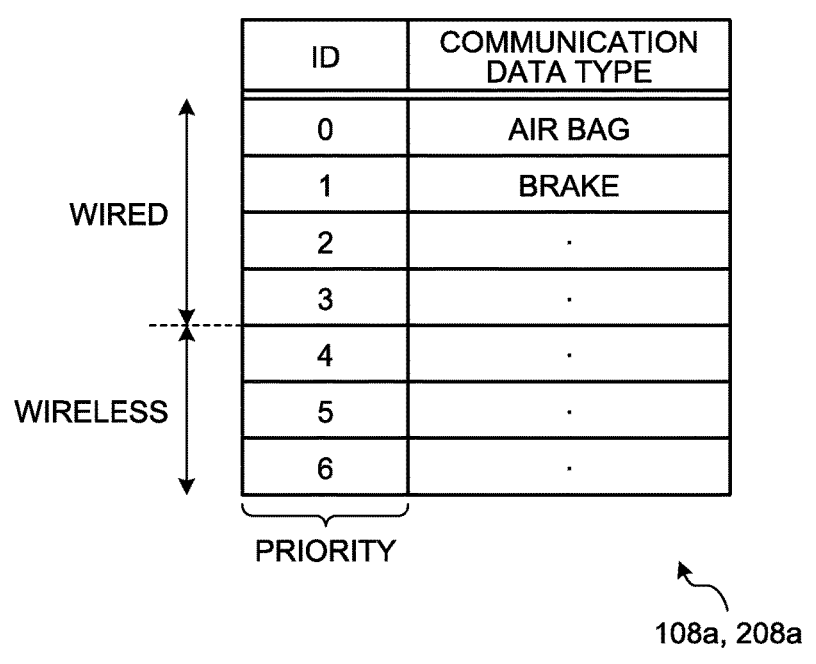
Figure 6:
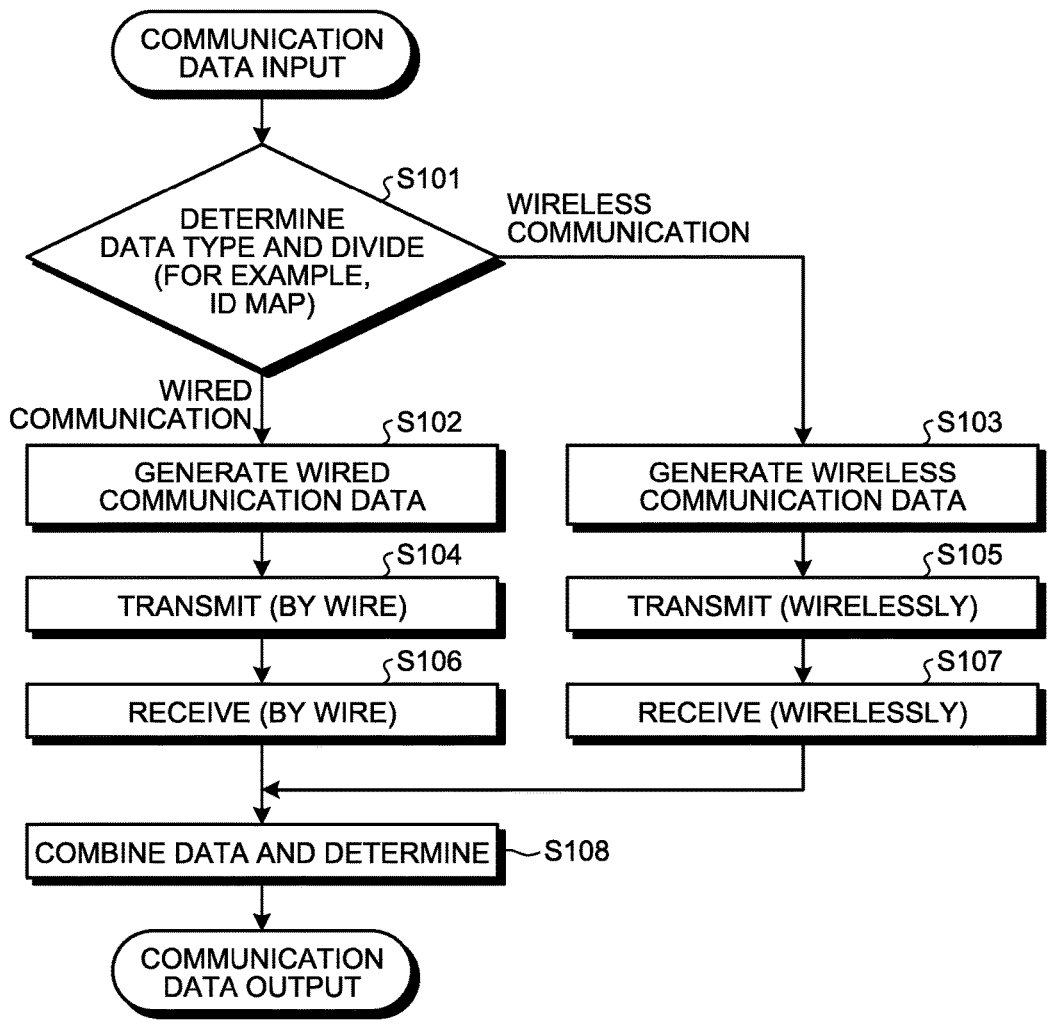
FIG. 6 is a flowchart illustrating the basic processing by the wired-wireless hybrid communication system according to the present embodiment.

A wired-wireless hybrid communication system and a wired-wireless hybrid communication method according to an embodiment will be described. FIG. 1 is a schematic diagram of a wired-wireless hybrid communication system according to the present embodiment. FIG. 2 is an illustration depicting an example of the wired-wireless hybrid communication system according to the present embodiment in a vehicle. FIG. 3 is a functional configuration diagram illustrating the details of a first communication device according to the present embodiment. FIG. 4 is a functional configuration diagram illustrating the details of a second communication device according to the present embodiment. FIG. 5 is a diagram illustrating an exemplary data priority information storage unit according to the present embodiment. FIG. 6 is a flowchart illustrating the basic processing by the wired-wireless hybrid communication system according to the present embodiment. FIG. 7 is a flowchart illustrating another example of the processing by the wired-wireless hybrid communication system according to the present embodiment.

As illustrated in FIG. 1, this wired-wireless hybrid communication system 1 according to the present embodiment is configured with at least a plurality of communication devices (for example, a first communication device 100 and a second communication device 200). In the following, for convenience of explanation, the first communication device 100 will be described as a communication device that transmits communication data, and the second communication device 200 will be described as a communication device that receives communication data. However, embodiments are not limited to this configuration. Depending on the situations, the first communication device 100 may be a communication device that receives communication data, and the second communication device 200 may be a communication device that transmits communication data. In the following, the first communication device 100 and the second communication device 200 may be simply referred to as communication devices 50 without distinction. These communication devices 50 are, for example, integrally provided in units and sensors mounted on a vehicle 10 or separately connected to them.

As illustrated in FIG. 2, the wired-wireless hybrid communication system 1 according to the present embodiment functions as a communication system capable of implementing both of the function of wired communication through a communication line and the function of wireless communication through an antenna, for communication data transmitted-received between the communication devices 50 in the vehicle 10. As an example, in FIG. 2, a wired-wireless hybrid communication system 1A functions as a communication system capable of wired communication and wireless communication between front sensors of the vehicle 10. In FIG. 2, a wired-wireless hybrid communication system 1B functions as a communication system capable of wired communication and wireless communication between rear sensors of the vehicle 10. In FIG. 2, a wired-wireless hybrid communication system 1C functions as a communication system capable of wired communication and wireless communication between a communication device 50 and an in-vehicle gateway (in-vehicle GW) 51 capable of inter-vehicle communication with a base station or another vehicle outside the vehicle 10. Here, the in-vehicle gateway 51 has the function of communicating with a communication device outside the vehicle via wide-range wireless communication and short-range wireless communication. This in-vehicle gateway 51 is an embodiment of the communication device 50 of the present embodiment. Examples of the scheme of wide-range wireless communication include radio (AM, FM), TV (UHF, 4K, 8K), telephone (TEL), global positioning system (GPS), worldwide interoperability for microwave access (WiMAX) (registered trademark), and inter-vehicle communication. Examples of the scheme of short-range wireless communication include electronic toll collection system (ETC)/dedicated short-range communications (DSRC), vehicle information and communication system (VICS) (registered trademark), wireless local area network (LAN), and millimeter-wave communication. In FIG. 2, the communication devices 50 and the in-vehicle gateway 51 in the vehicle 10 are each connected to an in-vehicle battery BT through a power line and supplied with power. This power line may be configured to enable power line communication (PLC).

Returning to FIG. 1, the first communication device 100 includes a controller 102, a first wired communication interface 104, a first wireless communication interface 106, and a storage unit 108. Similarly, the second communication device 200 includes a controller 202, a second wired communication interface 204, a second wireless communication interface 206, and a storage unit 208.

In FIG. 1, the controller 102 and the controller 202 are control means that performs various types of processing. The controller 102 of the first communication device 100 determines whether to transmit input communication data to the second communication device 200 via wired communication and/or transmit to the second communication device 200 via wireless communication, based on information stored in the storage unit 108. When communication data is to be transmitted via wired communication, the controller 102 controls the first wired communication interface 104 to transmit data to the second wired communication interface 204 connected through the communication line. When communication data is to be transmitted via wireless communication, the controller 102 controls the first wireless communication interface 106 to transmit communication data to the second wireless communication interface 206 connected to enable wireless communication through an antenna. The controller 202 of the second communication device 200 controls the second wired communication interface 204 to receive the communication data transmitted from the first communication device 100 via wired communication. The controller 202 also controls the second wireless communication interface 206 to receive the communication data transmitted from the first communication device 100 via wireless communication. The controller 202 then combines the communication data received via wired communication with the communication data received via wireless communication, based on the information stored in the storage unit 208. The controller 202 thereafter outputs the combined communication data. The details of the functions of the controller 102 and the controller 202 will be described later with reference to FIG. 3 and FIG. 4.

The first wired communication interface 104 and the second wired communication interface 204 are interfaces connected to a communication line and have the function of controlling communication by wire between the first communication device 100 and the second communication device 200. That is, the first wired communication interface 104 and the second wired communication interface 204 have the function of communicating data by wire through a communication network. Examples of the communication line include, but not limited to, LAN cables and dedicated communication lines such as a controller area network (CAN). In addition, when the power line is configured to enable power line communication (PLC), the first wired communication interface 104 and the second wired communication interface 204 may function as interfaces connected to electric wiring. In the following description, a single first wired communication interface 104 is included in the first communication device 100 and a single second wired communication interface 204 is included in the second communication device 200, by way of illustration. However, embodiments are not limited to this configuration. A plurality of first wired communication interfaces 104 may be included in the first communication device 100, and a plurality of second wired communication interfaces 204 may be included in the second communication device 200.

In the present embodiment, the power line and the communication line are configured as a wire harness installed in the vehicle 10. For example, the wire harness in the present embodiment bundles a plurality of connecting lines such as power lines and communication lines for power supply and signal communication into an assembly for connecting devices installed in the vehicle 10 to allow a connector to connect the connecting lines to devices at a time.

The first wireless communication interface 106 and the second wireless communication interface 206 each are an interface having an antenna that enables wireless communication via a variety of communication protocols and have the function of controlling communication wirelessly between the first communication device 100 and the second communication device 200. That is, the first wireless communication interface 106 and the second wireless communication interface 206 have the function of communicating data wirelessly through an antenna. The first wireless communication interface 106 and the second wireless communication interface 206 have the function of performing short-distance wireless communication, for example, including, but not limited to, wireless LAN, Wi-Fi (registered trademark), Bluetooth (registered trademark), and near field communication (NFC). In the following description, a single first wireless communication interface 106 is included in the first communication device 100, and a single second wireless communication interface 206 is included in the second communication device 200, by way of illustration. However, embodiments are not limited to this configuration. A plurality of first wireless communication interfaces 106 may be included in the first communication device 100, and a plurality of second wireless communication interfaces 206 may be included in the second communication device 200.

The storage unit 108 and the storage unit 208 are large-capacity storage means such as HDD and SSD and/or storage means such as small-capacity high-speed memory (for example, cache memory) including static random access memory (SRAM) and may store therein a variety of databases, files, and tables (for example, a data priority information table 108a and a data priority information table 208a). Here, the storage unit 108 and the storage unit 208 may be those configured to temporarily store therein a variety of files and others. The details of the data priority information table 108a in the storage unit 108 and the data priority information table 208a in the storage unit 208 will be described later with reference to FIG. 5.

Referring now to FIG. 3, the details of the controller 102 of the first communication device 100 will be described. In FIG. 3, the controller 102 includes a data type determining unit 102a, a transmission data priority identifying unit 102b, a data dividing unit 102c, a wired communication data generating unit 102d, a wired transmission controller 102e, a wireless communication data generating unit 102f, a wireless transmission controller 102g, a remaining data volume estimating unit 102h, a data volume determining unit 102i, a wired reception controller 102j, a wireless reception controller 102k, a received data priority identifying unit 102m, and a data combining unit 102n.

Among those, the data type determining unit 102a determines the type of communication data to be transmitted from the first communication device 100 to the second communication device 200. The transmission data priority identifying unit 102b refers to data priority information stored in the data priority information table 108a (see FIG. 5) serving as the data priority information storage unit of the first communication device 100 to identify the priority associated with the type of communication data determined by the data type determining unit 102a.

As illustrated in FIG. 5, the data priority information tables 108a and 208a store therein the data priority information that defines the priority for each type of communication data transmitted-received between the first communication device 100 and the second communication device 200 provided in the vehicle 10. In the example in FIG. 5, the priorities are set as ID numbers from "0" to "6". In this example, the smaller ID number indicates higher priority. For example, in FIG. 5, an ID number "0" is set as high priority for communication data including information such as signals and commands related to the air bag. In FIG. 5, an ID number "1" is set for communication data including information such as signals and commands related to the brake. Here, in the data priority information tables 108a and 208a, the ID numbers from "0" to "3" are defined as high priority to allow data communication via wired communication. The ID numbers from "4" to "6" are defined as low priority to allow data communication via wireless communication.

As illustrated in FIG. 5, the communication data related to the air bag, which is one of the safety-related device group of the vehicle 10, is communication data related to safety control of the vehicle 10 and thus set to the highest priority. The safety-related device group includes, for example, yaw rate sensor, air bag, wheel sensor, and automated cruise ECU. The communication data related to the brake, which is one of the power train-related device group of the vehicle 10, is communication data related to vehicle control and set to the next highest priority after safety control. The power train-related device group includes hybrid controller, steering sensor, engine, suspension, steering by wire, transmission, battery sensor, and brake by wire.

Although not illustrated in FIG. 5, the types of communication data include, in addition to the communication data related to the safety-related device group (for example, air bag) and the communication data related to the power train-related device group (for example, brake), communication data related to each of the body-related device group, the multimedia-related device group, the power supply-related device group, the diagnosis-related device group, and the charging-related device group. The body-related device group includes, for example, power swing door, memory seats, air conditioner, meters, shift by wire, lamps, rear controller, and power trunk. The multimedia-related device group includes navigation device, display, amplifier, and external communication unit. The power supply-related device group includes power supply area master, power supply area slave, and low voltage-high voltage battery packs. The diagnosis-related device group includes diagnosis tool (scan tool). The charging-related device group includes charger.

The communication data related to, but not limited to, the body-related device group, the multimedia-related device group, the power supply-related device group, the diagnosis-related device group, and the charging-related device group may be set as relatively low-priority communication data, compared with the communication data related to the safety-related device group (for example, air bag) and the communication data related to the power train-related device group (for example, brake). Among the body-related device group, the multimedia-related device group, the power supply-related device group, the diagnosis-related device group, and the charging-related device group, the body-related device group and the power supply-related device group may be set as relatively high-priority communication data compared with the multimedia-related device group, the diagnosis-related device group, and the charging-related device group.

In the present embodiment, when determining the type of communication data to be transmitted from the first communication device 100 to the second communication device 200, the data type determining unit 102a determines the type of communication data by classifying the communication data into, for example, the communication data related to the air bag or the communication data related to the brake. For example, in the case of the communication data related to the air bag, the transmission data priority identifying unit 102b identifies the priority associated with the type of communication data as the ID number "0", based on the type of communication data determined by the data type determining unit 102a.

Returning to FIG. 3, the data dividing unit 102c makes a division into high-priority communication data and low-priority communication data, based on the priority identified by the transmission data priority identifying unit 102b. In the present embodiment, for example, as illustrated in FIG. 5, the data dividing unit 102c divides the types of the communication data having priority of ID numbers "0" to "3" including the communication data related to the air bag and the brake, as high-priority communication data. The data dividing unit 102c divides the types of the communication data having priority of ID numbers "4" to "6" other than "0" to "3", as low-priority communication data.

The wired communication data generating unit 102d generates the high-priority communication data divided by the data dividing unit 102c, as wired communication data that can be communicated by wire. The wired transmission controller 102e transmits the wired communication data generated by the wired communication data generating unit 102d to the second communication device 200 through the first wired communication interface 104. The wireless communication data generating unit 102f generates the low-priority communication data divided by the data dividing unit 102c, as wireless communication data that can be communicated wirelessly. The wireless transmission controller 102g transmits the wireless communication data generated by the wireless communication data generating unit 102f to the second communication device 200 through the first wireless communication interface 106.

The remaining data volume estimating unit 102h estimates the remaining data volume that can be transmitted to the second communication device 200 through the first wired communication interface 104, based on the data volume of the high-priority communication data divided by the data dividing unit 102c. The data volume determining unit 102i determines whether the data volume of the low-priority communication data divided by the data dividing unit 102c is smaller than the remaining data volume estimated by the remaining data volume estimating unit 102h.

Here, when the data volume determining unit 102i determines that the data volume of the low-priority communication data is smaller than the remaining data volume estimated by the remaining data volume estimating unit 102h, the wired communication data generating unit 102d may generate both of the high-priority communication data and the low-priority communication data divided by the data dividing unit 102c, as wired communication data.

When the data volume determining unit 102i determines that the data volume of the low-priority communication data is equal to or larger than the remaining data volume estimated by the remaining data volume estimating unit 102*h*, the data dividing unit 102*c* may re-divide the low-priority communication data so as to include part of the low-priority communication data in addition to the high-priority communication data, until the data volume corresponding to the remaining data volume is reached. The wired communication data generating unit 102*d* then may generate wired communication data by adding part of the low-priority communication data re-divided by the data dividing unit 102*c* to the high-priority communication data. Furthermore, the wireless communication data generating unit 102*f* may generate the remainder of the low-priority communication data that is not added to the high-priority communication data when re-divided by the data dividing unit 102*c*, as wireless communication data.

The wired reception controller 102*j* receives the wired communication data transmitted by a wired transmission controller 202*e* from the second communication device 200, through the first wired communication interface 104. The wireless reception controller 102*k* receives the wireless communication data transmitted by a wireless transmission controller 202*g* from the second communication device 200, through the first wireless communication interface 106. The received data priority identifying unit 102*m* refers to the data priority information stored in the data priority information table 108*a* serving as the data priority information storage unit of the first communication device 100 to identify the priority associated with the wired communication data received by the wired reception controller 102*j* and the priority associated with the wireless communication data received by the wireless reception controller 102*k*. The data combining unit 102*n* reconstructs the communication data by combining the wired communication data and the wireless communication data together, based on the priority of the wired communication data and the priority of the wireless communication data identified by the received data priority identifying unit 102*m*.

Referring now to FIG. 4, the details of the controller 202 of the second communication device 200 will be described. In FIG. 4, the controller 202 includes a data type determining unit 202*a*, a transmission data priority identifying unit 202*b*, a data dividing unit 202*c*, a wired communication data generating unit 202*d*, the wired transmission controller 202*e*, a wireless communication data generating unit 202*f*, the wireless transmission controller 202*g*, a remaining data volume estimating unit 202*h*, a data volume determining unit 202*i*, a wired reception controller 202*j*, a wireless reception controller 202*k*, a received data priority identifying unit 202*m*, and a data combining unit 202*n*. In the present embodiment, the functions of the first communication device 100 and the second communication device 200 are basically the same.

Among those, the data type determining unit 202*a* determines the type of communication data to be transmitted from the second communication device 200 to the first communication device 100. The transmission data priority identifying unit 202*b* refers to the data priority information stored in the data priority information table 208*a* (see FIG. 5) serving as the data priority information storage unit of the second communication device 200 to identify the priority associated with the type of communication data determined by the data type determining unit 202*a*. The data dividing unit 202*c* makes a division into high-priority communication data and low-priority communication data, based on the priority identified by the transmission data priority identifying unit 202*b*.

The wired communication data generating unit 202*d* generates the high-priority communication data divided by the data dividing unit 202*c*, as wired communication data that can be communicated by wire. The wired transmission controller 202*e* transmits the wired communication data generated by the wired communication data generating unit 202*d* to the first communication device 100 through the second wired communication interface 204. The wireless communication data generating unit 202*f* generates the low-priority communication data divided by the data dividing unit 202*c*, as wireless communication data that can be communicated wirelessly. The wireless transmission controller 202*g* transmits the wireless communication data generated by the wireless communication data generating unit 202*f* to the first communication device 100 through the second wireless communication interface 206.

The remaining data volume estimating unit 202*h* estimates the remaining data volume that can be transmitted to the first communication device 100 through the second wired communication interface 204, based on the data volume of the high-priority communication data divided by the data dividing unit 202*c*. The data volume determining unit 202*i* determines whether the data volume of the low-priority communication data divided by the data dividing unit 202*c* is smaller than the remaining data volume estimated by the remaining data volume estimating unit 202*h*.

When the data volume determining unit 202*i* determines that the data volume of the low-priority communication data is smaller than the remaining data volume estimated by the remaining data volume estimating unit 202*h*, the wired communication data generating unit 202*d* may generate both of the high-priority communication data and the low-priority communication data divided by the data dividing unit 202*c*, as wired communication data.

When the data volume determining unit 202*i* determines that the data volume of the low-priority communication data is equal to or larger than the remaining data volume estimated by the remaining data volume estimating unit 202*h*, the data dividing unit 202*c* may make a re-division so as to include part of the low-priority communication data in addition to the high-priority communication data, until the data volume corresponding to the remaining data volume is reached. The wired communication data generating unit 202*d* then may generate the high-priority communication data and part of the low-priority communication data re-divided by the data dividing unit 202*c*, as wired communication data. In addition, the wireless communication data generating unit 202*f* may generate the remainder of the low-priority communication data that is not added to the high-priority communication data when re-divided by the data dividing unit 202*c*, as wireless communication data.

The wired reception controller 202*j* receives the wired communication data transmitted by the wired transmission controller 102*e* from the first communication device 100, through the second wired communication interface 204. The wireless reception controller 202*k* receives the wireless communication data transmitted by the wireless transmission controller 102*g* from the first communication device 100, through the second wireless communication interface 206. The received data priority identifying unit 202*m* refers to the data priority information stored in the data priority information table 208*a* serving as the data priority information storage unit of the second communication device 200 to identify the priority associated with the wired communication data received by the wired reception controller 202*j* and the priority associated with the wireless communication data received by the wireless reception controller 202*k*. The data combining unit 202n reconstructs the communication data by combining the wired communication data and the wireless communication data together, based on the priority of the wired communication data and the priority of the wireless communication data identified by the received data priority identifying unit 202m.

An example of the wired-wireless hybrid communication method performed in the wired-wireless hybrid communication system 1 of the present embodiment configured as described above will be described below with reference to FIG. 6.

As illustrated in FIG. 6, the data type determining unit 102a of the first communication device 100 determines the type of the input communication data to be transmitted from the first communication device 100 to the second communication device 200. The transmission data priority identifying unit 102b of the first communication device 100 then refers to the data priority information stored in the data priority information table 108a of the first communication device 100 to identify the priority associated with the type of the communication data determined by the data type determining unit 102a. The data dividing unit 102c of the first communication device 100 then makes a division into high-priority communication data and low-priority communication data, based on the priority identified by the transmission data priority identifying unit 102b (step S101).

The processing at step S101 by the data type determining unit 102a, the transmission data priority identifying unit 102b, and the data dividing unit 102c of the first communication device 100 is the data type determination and division processing for implementing a reliable communication system for transmitting an important signal via wired communication. Although this processing at step S101 performed by referring to the data priority information table 108a (ID map) illustrated in FIG. 5 is described in the foregoing example, the data priority information table 108a is an example of the data priority information storage unit. In addition, the data priority information may be information illustrated below. For example, in the data priority information, the high-priority communication data used in wired communication may include a security signal, and the low-priority communication data used in wireless communication may include a data signal. As an example, the security signal is, for example, an encryption key or an ID. The data signal is a data body encrypted by the encryption key of the security signal or a data body with the ID of the security signal. In the data priority information, the high-priority communication data used in wired communication may include a signal of high importance in control of the vehicle 10, and the low-priority communication data used in wireless communication may include a signal of low importance in control of the vehicle 10. As an example, the signal of high importance is, for example, a signal related to the safety-related device group or the power train-related device group. The signal of low importance is, for example, a signal related to the multimedia-related device group or the diagnosis-related device group. In the data priority information, the high-priority communication data used in wired communication may include an important signal related to control of the vehicle 10, and the low-priority communication data used in wireless communication may include all of the signals related to control of the vehicle 10. As an example, the important signal is a signal required to be redundant (for example, a signal related to the safety-related device group). All of the signals are signals related to the body-related device group, the safety-related device group, the power train-related device group, the multimedia-related device group, the power supply-related device group, the diagnosis-related device group, and the charging-related device group. In the data priority information, the high-priority communication data used in wired communication may include a control signal, and the low-priority communication data used in wireless communication may include a data signal. As an example, the control signal is a signal related to control of the vehicle 10. The data signal is a data body to which command content is added by the control signal.

In addition, the processing at step S101 is also the data type determination and division processing for implementing a communication system for transmitting a signal that requires reduction of a delay time via a wired signal and transmitting a signal that permits a delay time to some extent via wired communication. The data priority information in this case may be the following information. For example, in the data priority information, the high-priority communication data used in wired communication may include a control signal, and the low-priority communication data used in wireless communication may include a data signal. Alternatively, in the data priority information, as the high-priority communication data used in wired communication, the signals related to the safety-related device group may include a signal that requires reduction of a delay time, and the signals related to the safety-related device group may include a signal that permits a delay time to some extent. As an example, of the signals related to the safety-related device group, the signal that requires reduction of a delay time is, for example, down-sampled information of camera images for detecting an obstacle at a short distance. Of the signals related to the safety-related device group, the signal that permits a delay time to some extent is, for example, full information of camera images for detecting an obstacle at a long distance.

Returning to FIG. 6, for the divided communication data determined to be used in wired communication in the processing at step S101, the wired communication data generating unit 102d of the first communication device 100 generates the high-priority communication data divided by the data dividing unit 102c at step S101, as wired communication data that can be communicated by wire (step S102). The wired transmission controller 102e of the first communication device 100 then transmits the wired communication data generated by the wired communication data generating unit 102d at step S102 to the second communication device 200 through the first wired communication interface 104 (step S104).

The wired reception controller 202j of the second communication device 200 receives the wired communication data transmitted by the wired transmission controller 102e from the first communication device 100 at step S104, through the second wired communication interface 204 (step S106). The process then proceeds to step S108.

On the other hand, for the divided communication data determined to be used in wireless communication in the processing at step S101, the wireless communication data generating unit 102f of the first communication device 100 generates the low-priority communication data divided by the data dividing unit 102c at step S101, as wireless communication data that can be communicated wirelessly (step S103). The wireless transmission controller 102g of the first communication device 100 then transmits the wireless communication data generated by the wireless communication data generating unit 102f at step S103 to the second communication device 200 through the first wireless communication interface 106 (step S105).

The wireless reception controller 202k of the second communication device 200 receives the wireless communication data transmitted by the wireless transmission controller 102g from the first communication device 100 at step S105, through the second wireless communication interface 206 (step S107). The process then proceeds to step S108.

The received data priority identifying unit 202m of the second communication device 200 refers to the data priority information stored in the data priority information storage unit of the second communication device 200 to identify the priority associated with the wired communication data received by the wired reception controller 202j at step S106 and the priority associated with the wireless communication data received by the wireless reception controller 202k at step S107. The data combining unit 202n of the second communication device 200 then reconstructs the communication data by combining the wired communication data and the wireless communication data together, based on the priority of the wired communication data and the priority of the wireless communication data identified by the received data priority identifying unit 202m (step S108). At step S108, the controller 202 may determine whether the reconstructed communication data has any error. The communication data is thereafter output, and the present process ends.

Referring now to FIG. 7, the details of another example of the wired-wireless hybrid communication method performed in the wired-wireless hybrid communication system 1 will be detailed below.

As illustrated in FIG. 7, the data type determining unit 102a of the first communication device 100 determines the type of the input communication data to be transmitted from the first communication device 100 to the second communication device 200. The transmission data priority identifying unit 102b of the first communication device 100 then refers to the data priority information stored in the data priority information table 108a of the first communication device 100 to identify the priority associated with the type of the communication data determined by the data type determining unit 102a. The data dividing unit 102c then makes a division into high-priority communication data and low-priority communication data, based on the priority identified by the transmission data priority identifying unit 102b (step S201).

In the processing at step S201, for the high-priority communication data temporarily determined to be used in wired communication and divided in the processing at step S201, the remaining data volume estimating unit 102h of the first communication device 100 estimates the remaining data volume (in FIG. 7, data volume: DA) that can be transmitted to the second communication device 200 through the first wired communication interface 104, based on the data volume (in FIG. 7, data volume: D0) of the high-priority communication data divided by the data dividing unit 102c at step S201 (step S202). Then, the information of the remaining data volume (data volume: DA) that can be transmitted to the second communication device 200 as estimated at step S202 is used in the determination processing at step S203.

In the processing at step S201, for the low-priority communication data temporarily determined to be used in wireless communication and divided in the processing at step S201, the data volume determining unit 102i of the first communication device 100 determines whether the data volume (in FIG. 7, data volume: D1) of the low-priority communication data divided by the data dividing unit 102c at step S201 is smaller than the remaining data volume (data volume: DA) estimated by the remaining data volume estimating unit 102h (step S203).

At step S203, if it is determined in the processing by the data volume determining unit 102i that the data volume (data volume: D1) of the low-priority communication data is smaller than the remaining data volume (data volume: DA) (DA>D1), the wired communication data generating unit 102d of the first communication device 100 performs the processing at step S206 as the processing for performing data communication using wired communication alone. Specifically, the wired communication data generating unit 102d of the first communication device 100 generates both of the high-priority communication data (data volume: D0) and the low-priority communication data (data volume: D1) divided by the data dividing unit 102c at step S201, as wired communication data (step S206). The wired transmission controller 102e of the first communication device 100 then transmits the wired communication data generated by the wired communication data generating unit 102d at step S206 to the second communication device 200 through the first wired communication interface 104 (step S207). The wired reception controller 202j of the second communication device 200 then receives the wired communication data transmitted by the wired transmission controller 102e from the first communication device 100 at step S207, through the second wired communication interface 204 (step S210). The process then proceeds to step S212. When data communication is performed using wired communication alone, the process bypasses step S212 and proceeds to step S214, because no mark bit as described later is attached to the wired communication data. When data communication is performed using wired communication alone, the controller 202 of the second communication device 200 does not perform data combination of high-priority communication data (data volume: D0) and low-priority communication data (data volume: D1) included in the wired communication data but determines whether the communication data has any error. The data is thereafter output, and the present process ends.

Returning to the processing at step S203, if it is determined in the processing by the data volume determining unit 102i that the data volume (data volume: D1) of the low-priority communication data is equal to or larger than the remaining data volume (data volume: DA) (DA≤D1), the wired communication data generating unit 102d of the first communication device 100 performs the processing at step S204 as the processing for performing data communication using wired communication and wireless communication in combination. Specifically, the data dividing unit 102c of the first communication device 100 re-divides the low-priority communication data (data volume: D1) divided at step S201 so as to include part of the low-priority communication data (data volume: DA−D0=D1) in addition to the high-priority communication data (data volume: D0) until the data volume corresponding to the remaining data volume (data volume: DA) is reached (D0+D1=DA) (step S204). Subsequently, the controller 102 of the first communication device 100 attaches a mark bit to the communication data (data volume: DA) for wired communication including part of the low-priority communication data (data volume: DA−D0=D1) re-divided by the data dividing unit 102c at step S204 (step S205). For example, the controller 102 attaches a mark bit at a position where part of the low-priority communication data, which is communication data for wireless communication in the processing at step S201, is re-divided to be added to the communication data for wired communication. This mark bit is used when the receiver side recombines the communication data. The process then proceeds to step S206.

When data communication is performed using wired communication and wireless communication in combination in this way, the wired communication data generating unit 102d of the first communication device 100 generates wired communication data (data volume: DA) by adding part of the low-priority communication data (data volume: DA−D0=D1) re-divided by the data dividing unit 102c at step S204 to the high-priority communication data (data volume: D0) divided at step S201 (step S206). The wired transmission controller 102e of the first communication device 100 then transmits the wired communication data generated by the wired communication data generating unit 102d at step S206, to the second communication device 200 through the first wired communication interface 104 (step S207). The wired reception controller 202j of the second communication device 200 then receives the wired communication data transmitted by the wired transmission controller 102e from the first communication device 100 at step S207, through the second wired communication interface 204 (step S210). The process then proceeds to step S212.

The controller 202 of the second communication device 200 extracts data to be recombined with the wireless communication data received at step S211 (that is, the re-divided data added to the wired communication data at step S206), based on the mark bit attached to the wired communication data received by the wired reception controller 202j at step S210 (step S212). The process then proceeds to step S213.

After the processing at step S204, the wireless communication data generating unit 102f of the first communication device 100 generates the remainder of the low-priority communication data that is not added to the high-priority communication data when the data dividing unit 102c makes a re-division at step S204, as wireless communication data (step S208). The wireless transmission controller 102g of the first communication device 100 then transmits the wireless communication data generated by the wireless communication data generating unit 102f at step S208 to the second communication device 200 through the first wireless communication interface 106 (step S209). The wireless reception controller 202k of the second communication device 200 then receives the wireless communication data transmitted by the wireless transmission controller 102g from the first communication device 100 at step S209, through the second wireless communication interface 206 (step S211). The process then proceeds to step S213.

The data combining unit 202n of the second communication device 200 combines the remaining data in the re-division at step S204 with the re-divided data extracted at step S212 (step S213). Specifically, the data combining unit 202n of the second communication device 200 combines the wireless communication data received by the wireless reception controller 202k at step S211 with part of the low-priority communication data extracted from the wired communication data at step S212. The data combining unit 202n of the second communication device 200 then combines the remaining high-priority communication data not extracted from the wired communication data at step S212 with the low-priority communication data re-combined at step S213 (step S214). At step S214, the controller 202 may determine whether the reconstructed communication data has any error. The data is thereafter output, and the present process ends.

In this way, the processing illustrated in FIG. 7 implements a communication system in which data communication is basically performed via wired communication and, if the data overflows, complemented by wireless communication. In this case, wired communication and wireless communication are used depending on the possible cases as follows. Data communication via wired communication is intended for, for example, of the communication data related to the multimedia-related device group, audio signals for radio, video signals for one-segment TV, and video signals corresponding to part of full-segment TV. In this case, data communication via wireless communication is intended for, for example, of the communication data related to the multimedia-related device group, video signals corresponding to the remainder of full-segment TV. As other examples, download data such as updating software for ECU and map data for navigation may be basically communicated via wired communication and, if the data overflows, complemented by wireless communication.

As explained above, the wired-wireless hybrid communication system and the wired-wireless hybrid communication method according to the present embodiments can perform control such that, of the types of communication data transmitted-received between communication devices provided in the vehicle, wired communication is used for high-priority communication data and wireless communication is used for low-priority communication data. This control eliminates the need for connecting all of the communication devices in the vehicle through an expensive communication line capable of large-volume data communication in order to improve the reliability of data communication and can simplify the communication line in the vehicle while securing reliability of data communication. As a result, when a variety of communication data is transmitted-received through wired and wireless hybrid communication between communication devices provided in the vehicle, the costs for wired communication can be reduced while reliability of data communication is improved. In this way, the wired-wireless hybrid communication system and the wired-wireless hybrid communication method according to the present embodiments enable a variety of communication data to be appropriately transmitted-received via wired and wireless hybrid communication between communication devices provided in the vehicle.

Although the present invention has been described above based on embodiments, the present invention is not limited to the foregoing embodiments and is susceptible to modifications without departing from the spirit of the present invention and combinations with other techniques as appropriate in a possible range.

For example, although the first communication device and the second communication device have the same functions in the foregoing description, the present invention is not limited to such an embodiment. One of the first communication device and the second communication device may have the function required by the transmitter communication device, and the other may have the function required by the receiver communication device. The functions required by the transmitter communication device are, for example, the functions of the data type determining unit, the transmission data priority identifying unit, the data dividing unit, the wired communication data generating unit, the wired transmission controller, the wireless communication data generating unit, the wireless transmission controller, the remaining data volume estimating unit, and the data volume determining unit. The functions required by the receiver communication device are, for example, the functions of the wired reception controller, the wireless reception controller, the received data priority identifying unit, and the data combining unit.

The wired-wireless hybrid communication system and the wired-wireless hybrid communication method according to the present embodiments can perform control such that, of the types of communication data transmitted-received between communication devices provided in the vehicle, wired communication is used for high-priority communication data and wireless communication is used for low-priority communication data. This control enables a variety of communication data to be transmitted-received appropriately via wired and wireless hybrid communication between the communication devices provided in the vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wired-wireless hybrid communication system comprising:
   a first communication device including at least a controller, a storage unit, a first wired communication interface, and a first wireless communication interface;
   a second communication device connected to be able to communicate with the first communication device by wire and wirelessly, the second communication device including at least a controller, a storage unit, a second wired communication interface, and a second wireless communication interface, wherein
   the storage unit of the first communication device and the storage unit of the second communication device, each includes a data priority information storage unit configured to store therein data priority information defining priority for each type of communication data transmitted and received between the first communication device and the second communication device provided in a vehicle,
   the controller of the first communication device includes
   a data type determining unit configured to determine a type of the communication data to be transmitted from the first communication device to the second communication device,
   a transmission data priority identifying unit configured to refer to the data priority information stored in the data priority information storage unit of the first communication device to identify the priority associated with the type of the communication data determined by the data type determining unit,
   a data dividing unit configured to make a division into communication data having high priority and communication data having low priority, based on the priority identified by the transmission data priority identifying unit,
   a wired communication data generating unit configured to generate the communication data having high priority divided by the data dividing unit, as wired communication data transmittable by wire,
   a wired transmission controller configured to transmit the wired communication data generated by the wired communication data generating unit to the second communication device through the first wired communication interface,
   a wireless communication data generating unit configured to generate the communication data having low priority divided by the data dividing unit, as wireless communication data transmittable wirelessly, and
   a wireless transmission controller configured to transmit the wireless communication data generated by the wireless communication data generating unit to the second communication device through the first wireless communication interface,
   the controller of the second communication device includes
   a wired reception controller configured to receive the wired communication data transmitted by the wired transmission controller from the first communication device, through the second wired communication interface,
   a wireless reception controller configured to receive the wireless communication data transmitted by the wireless transmission controller from the first communication device, through the second wireless communication interface,
   a received data priority identifying unit configured to refer to the data priority information stored in the data priority information storage unit of the second communication device to identify the priority associated with each of the wired communication data received by the wired reception controller and the wireless communication data received by the wireless reception controller, and
   a data combining unit configured to reconstruct the communication data by combining the wired communication data and the wireless communication data together, based on the priority of the wired communication data and the priority of the wireless communication data identified by the received data priority identifying unit,
   the controller of the first communication device further includes
   a remaining data volume estimating unit configured to estimate a remaining data volume transmittable to the second communication device through the first wired communication interface, based on a data volume of the communication data having high priority divided by the data dividing unit and
   a data volume determining unit configured to determine whether a data volume of the communication data having low priority divided by the data dividing unit is smaller than the remaining data volume estimated by the remaining data volume estimating unit, and
   when the data volume determining unit determines that the data volume of the communication data having low priority is smaller than the remaining data volume estimated by the remaining data volume estimating unit, the wired communication data generating unit generates both of the communication data having high priority and the communication data having low priority divided by the data dividing unit as the wired communication data.

2. The wired-wireless hybrid communication system according to claim 1, wherein
   when the data volume determining unit determines that the data volume of the communication data having low priority is equal to or larger than the remaining data volume estimated by the remaining data volume estimating unit, the data dividing unit re-divides the communication data having low priority so as to include part of the communication data having low priority in addition to the communication data having high priority until a data volume corresponding to the remaining data volume is reached,
   the wired communication data generating unit generates part of the communication data having low priority re-divided by the data dividing unit in addition to the communication data having high priority, as the wired communication data, and the wireless communication data generating unit generates remainder of the communication data having low priority not added to the communication data having high priority when re-divided by the data dividing unit, as the wireless communication data.

3. A wired-wireless hybrid communication method performed in a wired-wireless hybrid communication system including a first communication device and a second communication device, the first communication device at least including a controller, a storage unit, a first wired communication interface, and a first wireless communication interface, the second communication device being connected to be able to communicate with the first communication device by wire and wirelessly, the second communication device at least including a controller, a storage unit, a second wired communication interface, and a second wireless communication interface, the storage unit of the first communication device and the storage unit of the second communication device each including a data priority information storage unit configured to store therein data priority information defining priority for each type of communication data transmitted and received between the first communication device and the second communication device provided in a vehicle, the wired-wireless hybrid communication method comprising:

a data type determining step performed by the controller of the first communication device configured to determine a type of the communication data to be transmitted from the first communication device to the second communication device;

a transmission data priority identifying step performed by the controller of the first communication device configured to refer to the data priority information stored in the data priority information storage unit of the first communication device and to identify the priority associated with the type of the communication data determined at the data type determining step;

a data dividing step performed by the controller of the first communication device configured to make a division into communication data having high priority and communication data having low priority, based on the priority identified at the transmission data priority identifying step;

a wired communication data generating step performed by the controller of the first communication device configured to generate the communication data having high priority divided at the data dividing step, as wired communication data transmittable by wire;

a wireless communication data generating step performed by the controller of the first communication device configured to generate the communication data having low priority divided at the data dividing step, as wireless communication data transmittable wirelessly;

a wired transmission controlling step performed by the controller of the first communication device configured to transmit the wired communication data generated at the wired communication data generating step to the second communication device through the first wired communication interface;

a wired reception controlling step performed by the controller of the second communication device configured to receive the wired communication data transmitted from the first communication device at the wired transmission controlling step, through the second wired communication interface;

a wireless transmission controlling step performed by the controller of the first communication device configured to transmit the wireless communication data generated at the wireless communication data generating step to the second communication device through the first wireless communication interface;

a wireless reception controlling step performed by the controller of the second communication device configured to receive the wireless communication data transmitted from the first communication device at wireless transmission controlling step, through the second wireless communication interface;

a received data priority identifying step performed by the controller of the second communication device configured to refer to the data priority information stored in the data priority information storage unit of the second communication device and to identify the priority associated with each of the wired communication data received at the wired reception controlling step and the wireless communication data received at the wireless reception controlling step; and a data combining step configured to reconstruct the communication data by combining the wired communication data and the wireless communication data together, based on the priority of the wired communication data and the priority of the wireless communication data identified at the received data priority identifying step;

a remaining data volume estimating step performed by the controller of the first communication device configured to estimate a remaining data volume transmittable to the second communication device through the first wired communication interface, based on a data volume of the communication data having high priority divided at the data dividing step; and a data volume determining step performed by the controller of the first communication device configured to determine whether a data volume of the communication data having low priority divided at the data dividing step is smaller than the remaining data volume estimated at the remaining data volume estimating step, wherein at the wired communication data generating step, when it is determined at the data volume determining step that the data volume of the communication data having low priority is smaller than the remaining data volume estimated at the remaining data volume estimating step, both of the communication data having high priority and the communication data having low priority divided at the data dividing step are generated as the wired communication data.

4. The wired-wireless hybrid communication method according to claim 3, wherein at the data dividing step, when it is determined at the data volume determining step that the data volume of the communication data having low priority is equal to or larger than the remaining data volume estimated at the remaining data volume estimating step, the communication data having low priority is re-divided such that part of the communication data having low priority is included in addition to the communication data having high priority until a data volume corresponding to the remaining data volume is reached, at the wired communication data generating step, part of the communication data having low priority re-divided at the data dividing step is added to the communication data having high priority and generated as the wired communication data, and at the wireless communication data generating step, remainder of the communication data having low priority not added to the communication data having high priority when re-divided at the data dividing step is generated as the wireless communication data.

* * * * *